Patented Dec. 13, 1932

1,890,903

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

HEAT PLASTIC COMPOSITION AND METHOD OF MAKING SAME

No Drawing. Application filed December 28, 1926. Serial No. 157,624.

This invention relates to compositions produced from chlorine-containing derivatives of rubber and it has for an object to provide compositions of this character which shall be adapted for the manufacture of paints and like protective coating materials, or which shall be adapted for the manufacture of molded goods and other articles commonly made of shellac, of phenolic resins and of hard rubber. A further general object is to provide methods for producing economically such materials.

In carrying out the present invention, a chlorine-containing rubber derivative is treated with a phenol, or with an aromatic amine, preferably in the presence of a catalyst at elevated temperatures. In general ordinary steam bath temperatures are adequate, although higher temperatures may be employed, and the heating should be continued for an extended period in order to ensure the completion of the reaction. The resulting products are dry solid materials having no surface tack and range in thermoplastic properties from the readily heat-plastic varieties which are easily moldable at the usual molding temperatures to varieties which soften only at high temperatures. The products throughout this range are all more or less soluble in acetone, amyl acetate, and ethyl acetate, but generally insoluble in gasoline, chloroform, carbon tetrachloride, aqueous acids and alkalies.

It is generally desirable to rework the reaction product resulting from the above described procedure, in order to prepare it as a raw material for industrial uses, by homogenizing the mass, as by comminution, by mastication or by solution, and it is also desirable, in many cases, to wash the product free of water soluble impurities including residual alkali or acid. Alternatively, the residual acid or alkali of the reaction mixture, depending on whether an aromatic amine or a phenol has been employed in the reaction, may be neutralized by the addition of a suitable reagent, the heat-plastic recovered from the reaction mixture, as by solution and precipitation, and the product thereafter thoroughly washed and homogenized.

The character of the reaction in the above indicated procedure is not definitely known, but analysis of the end product, the yield of which is usually equal in weight to that of the starting product, and often greater, indicates that some of the chlorine in the chlorine-contained rubber derivative has been replaced by aromatic residues. These reactions are characterized by the formation of hydrogen chloride in the reaction mixture, which, however, is largely driven off during the reaction. The effect of the reaction in any case is to reduce the chlorine content of the rubber derivative treated, the chlorine content of chlorinated rubber, for example, being reduced by this reaction from approximately 61 per cent to about 50 per cent.

This process may be carried out with chlorine-containing rubber derivatives in general, such for example, as rubber sulfur chloride, chlorinated rubber, rubber hydrochloride, chlorinated rubber hydrochloride and chlorinated vulcanized rubber. The term "chlorine-containing rubber derivative" will hereinafter be employed to designate these substances and others obtained by the direct reaction of rubber with chlorine or a chlorine compound. Phenols, such as phenol, cresol, resorcinol, catechol, the naphthols, etc., and aromatic amines, such as aniline, toluidine, etc., are operable in this process. Numerous catalysts may be employed in this reaction but I have found that the halides of the amphoteric metals are especially adapted for this purpose and particularly such compounds as aluminum chloride, ferric chloride, zinc chloride and stannic chloride, which may be employed as anhydrous or in some cases as hydrated salts.

The following examples are given below to illustrate in greater detail the above indicated processes.

*Example 1.*—A superior thermoplastic product may be obtained from chlorinated rubber by treating it with phenol and zinc chloride as a catalyst. Thus, 50 parts by weight of chlorinated rubber, 100 parts of phenol and 12.5 parts of anhydrous zinc chloride are admixed and heated on a steam bath for several days. The mass becomes homogeneous and hydrogen chloride gas is given off, the reaction mixture assuming a deep maroon color. When the reaction has been completed, the heat-plastic constituent is recovered in any desirable manner, as by precipitating it out in water, collecting and drying the precipitate and preferably thereafter redissolving it in acetone and again precipitating the product in water which preferably contains a little hydrochloric acid, the latter acting as a coagulating agent. The precipitated product when dried is a yellow-brown powder which is thermoplastic and soluble in acetone, very slightly soluble in benzene, and insoluble in gasoline.

*Example 2.*—Chlorinated rubber may be treated with aniline without a catalyst to produce the products of the present application. Thus, 20 parts by weight of chlorinated rubber are placed in 200 parts of aniline and heated on a steam bath for three days. The chlorinated rubber dissolves in the aniline in about four hours and when the action has been completed the heat-plastic product may be isolated by precipitation in the manner above described in Example 1. The resulting product is a black powder which is nicely thermoplastic and which is soluble in acetone, to some extent in benzene, but insoluble in gasoline.

*Example 3.*—The ingredients of the preceding example may also be made to react at higher temperatures. Thus, 10 parts by weight of chlorinated rubber are placed in 20 parts of aniline and heated at the boiling temperature of the aniline, approximately 180° C. The reaction mixture at first becomes limpid and finally viscous. The solid constituent is recovered from the reaction mixture by washing out the aniline with water, giving a brown-red powder which is nicely thermoplastic. Where the purification is carried out with the assistance of dilute hydrochloric acid, the resulting brown-red powder has a high softening point so as to be practically non-thermoplastic. The products in either case are soluble in acetone but insoluble in gasoline.

*Example 4.*—Aniline may also be caused to react with the chlorinated rubber in benzene solution. Thus, 100 parts by weight of chlorinated rubber cement containing 20 parts of chlorinated rubber, and 35 parts of aniline are heated on a steam bath for twenty-four hours. The solvent is driven off by distillation and the product purified by solution in acetone and precipitation in water as described in Example 1. Excellent thermoplastic products suitable for molding operations are in this manner produced.

*Example 5.*—As an example of a procedure in which any other phenol than phenol itself is employed, take 10 parts by weight of chlorinated rubber, 30 parts of cresol and two parts of stannic chloride and heat the admixed ingredients on a steam bath for 24 hours. Upon distillation of the reaction mixture a fine thermoplastic product which is hard and brittle when cold, is produced.

*Example 6.*—The above ingredients may also be employed with the chlorinated rubber in solution, as by taking 2,000 parts by weight of a 20 per cent solution of chlorinated rubber in benzene and adding to that 720 parts of cresol and 44 parts of stannic chloride and heating for two days on a steam bath. The reaction mixture then subjected to steam distillation and the solid residue washed with water, as on a hot rubber mill, yields a readily moldable, hard, thermoplastic material.

*Example 7.*—Rubber sulfur chloride reacts with phenol or cresol at steam bath temperatures without the assistance of a catalyst. Thus, 100 parts by weight of rubber sulfur chloride mixed with 500 parts by weight of phenol and heated on a steam bath for 8 hours and the reaction product recovered by distilling off the phenol yields a solid heat-plastic residue somewhat of the character described in the preceding examples.

It will be understood that a catalyst of the character hereinabove described, while not essential to the reaction of the processes of this application as is hereinabove indicated in several of the examples, nevertheless, facilitates the reaction and is believed to be directive in its influence upon the reaction so that superior products better adapted as bases for paints and water-proof coatings or as high grade molded compounds are produced where the catalysts are employed.

Variations in the properties of the products of this application in general depend upon the catalyst used, the time and temperature of the reaction, and upon the phenol or aromatic amine employed, as well as the quantities of these ingredients used and to a certain extent upon whether or not a solvent for the chlorine-containing rubber is employed and the dilution of the solution. It is to be understood that the above suggested variations all fall within the principles of this invention and that they may be employed in the production of these products herein described by those skilled in this art, without in any way departing from the invention hereinabove set forth.

I claim:

1. A strong thermoplastic material comprising the reaction product of a chlorine-containing rubber derivative and a phenol in which a substantial portion of the chlorine is displayed by the phenol.

2. A non-tacky thermoplastic material comprising the reaction product of phenol and a chlorine-containing rubber derivative of the group consisting of rubber sulfurchloride, rubber hydrochloride and chlorinated rubber, in which a substantial portion of the chlorine is displaced by the phenol.

3. The method which comprises treating a chlorine-containing rubber derivative with a compound of the general formula R-X where R represents an aromatic nucleus and X represents a hydroxyl or amino group until a substantial part of the chlorine has been eliminated therefrom.

4. The method which comprises heating a chlorine-containing rubber derivative with a compound of the general formula R-X where R represents an aromatic nucleus and X represents a hydroxyl or amino group until a substantial part of the chlorine has been eliminated therefrom.

5. The method which comprises heating a chlorine-containing rubber derivative with a compound of the general formula R-X where R represents an aromatic nucleus and X represents a hydroxyl or amino group in the presence of a catalyst consisting of the chloride of an amphoteric metal, until a substantial part of the chlorine is eliminated therefrom.

6. The method which comprises heating a chlorine-containing rubber derivative with a phenol in the presence of a catalyst consisting of the chloride of an amphoteric metal until a substantial part of the chlorine is eliminated therefrom.

7. The method which comprises heating chlorinated rubber with a phenol in the presence of a catalyst selected from the group consisting of aluminum chloride, zinc chloride, ferric chloride and stannic chloride, until a substantial part of the chlorine is eliminated therefrom.

8. The method which comprises heating a chlorine-containing rubber derivative with a phenol until a substantial part of the chlorine is eliminated therefrom.

9. The method which comprises heating a chlorine-containing rubber derivative with an aromatic amine until a substantial part of the chlorine is eliminated therefrom.

10. The method which comprises heating a chlorine-containing rubber derivative with an aromatic amine in the presence of a catalyst selected from the group consisting of aluminum chloride, zinc chloride, ferric chloride and stannic chloride, until a substantial part of the chlorine is eliminated therefrom.

11. The method which comprises heating chlorinated rubber with aniline until a substantial part of the chlorine is eliminated therefrom.

12. A strong thermoplastic material comprising the reaction product of a chlorine-containing rubber derivative and a substance of the general formula R-X where R represents an aromatic nucleus and X represents a hydroxyl or amino group, and in which material a substantial part of the chlorine is displaced by the aromatic substance.

13. A strong thermoplastic material comprising the reaction product of a chlorine-containing rubber derivative and an aromatic amine, in which a substantial part of the chlorine is displaced by the aromatic amine.

In witness whereof I have hereunto set my hand this 20th day of November, 1926.

HARRY L. FISHER.

CERTIFICATE OF CORRECTION.

Patent No. 1,890,903. December 13, 1932.

HARRY L. FISHER.

It is hereby certified that error appears in the printed specification of the above numbered patent requiring correction as follows: Page 1, line 57, for "chlorine-contained" read "chlorine-containing"; page 2, line 123, claim 1, for "displayed" read "displaced"; and that the said Letters Patent should be read with these corrections therein that the same may conform to the record of the case in the Patent Office.

Signed and sealed this 16th day of May, A. D. 1933.

M. J. Moore.

(Seal) Acting Commissioner of Patents.